United States Patent [19]

Wilson

[11] 4,247,807

[45] Jan. 27, 1981

[54] METHOD AND APPARATUS FOR OPERATING DC MOTORS AT HIGH EFFICIENCY

[75] Inventor: James W. A. Wilson, Scotia, N.Y.

[73] Assignee: General Electric Company, Schenectady, N.Y.

[21] Appl. No.: 9,145

[22] Filed: Feb. 5, 1979

[51] Int. Cl.³ .............................................. H02P 5/16
[52] U.S. Cl. ................................... 318/338; 318/405; 318/493
[58] Field of Search ................ 318/338, 332, 493, 405

[56] References Cited

U.S. PATENT DOCUMENTS 4,037,144  7/1977  Ohmae et al. ......................... 318/338

FOREIGN PATENT DOCUMENTS 1100775  3/1961  Fed. Rep. of Germany ........... 318/338

Primary Examiner—David Smith, Jr.

Attorney, Agent, or Firm—William H. Steinberg; James C. Davis, Jr.; Paul R. Webb, II

[57] ABSTRACT

Operation of a separately excited DC motor at maximum efficiency is achieved by continuously varying armature and field current in accordance with an operator-commanded motor torque amplitude signal. Armature current is varied in accordance with its magnitude of deviation from an armature current command signal which is generated in accordance with a predetermined relationship between the operator-commanded torque amplitude signal and field current. Field current is simultaneously varied in accordance with its magnitude of deviation from a field current command signal which is generated in accordance with magnitude of the armature current command signal. Since the motor is thus provided with the optimum field at all times, maximum motor efficiency is achieved irrespective of loading or speed.

9 Claims, 2 Drawing Figures

METHOD AND APPARATUS FOR OPERATING DC MOTORS AT HIGH EFFICIENCY

BACKGROUND OF THE INVENTION

This invention relates to a control strategy for separately excited DC motors which provides for maximum motor efficiency irrespective of motor speed or loading, and more particularly to a method and apparatus for implementing this strategy.

It is desirable to operate DC motors at maximum efficiency because inefficient DC motor operation results in increased power consumption and motor wear. Operating a DC motor at maximum efficiency is most important when such motor is utilized to provide propulsion for an electric vehicle because the increased power consumption resulting from inefficient motor operation reduces the maximum vehicle range. Additionally, more frequent charging of the vehicle batteries is required for the vehicle to traverse a given distance, causing increased battery drain and, ultimately, a reduced battery lifetime.

Heretofore, conventional DC motor control strategy has not sought to maximize motor efficiency. Rather, maximization of torque/ampere has been a common objective. Use of such a conventional control strategy for a DC motor drive system results in maximum motor efficiency at only one value of motor torque and speed. At other torque values, the DC motor drive system operates inefficiently.

The present invention concerns a control strategy for operating a DC motor drive system at maximum efficiency irrespective of motor loading and speed.

BRIEF SUMMARY OF THE INVENTION

Briefly, in accordance with a preferred embodiment of the invention, a method for operating a separately excited DC motor drive system in response to an operator-commanded motor torque amplitude signal to achieve maximum motor efficiency irrespective of motor torque and speed comprises the following steps. An armature current command signal is first synthesized according to a predetermined relationship between the operator-commanded motor torque amplitude signal and motor field current. A field current command signal is then synthesized in proportion to the magnitude of the armature current command signal. Armature current and field current are, in turn, varied according to the difference in magnitude between the armature current command signal and armature current, and the field current command signal and field current, respectively, thereby providing optimum field current to the motor for maximum motor efficiency.

In accordance with an additional preferred embodiment of the invention, an improved control apparatus for operating a separately excited DC motor at maximum motor efficiency irrespective of motor torque and speed comprises a first circuit for synthesizing an armature current command signal in accordance with a predetermined relationship between an operator-commanded motor torque amplitude signal and motor field current. A second circuit synthesizes a field current command signal in accordance with the magnitude of the armature current command signal generated by the first circuit. Third and fourth circuits vary armature current and field current, respectively, in accordance with the difference in magnitude between the armature current command signal and armature current and between the field current command signal and field current, respectively, thereby providing optimum field current to the motor for maximum motor efficiency.

It is an object of the present invention to provide a control strategy for operating a separately excited DC motor at maximum possible motor efficiency irrespective of motor loading and speed.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE PREFERRED EMBODIMENT

Figure 1:
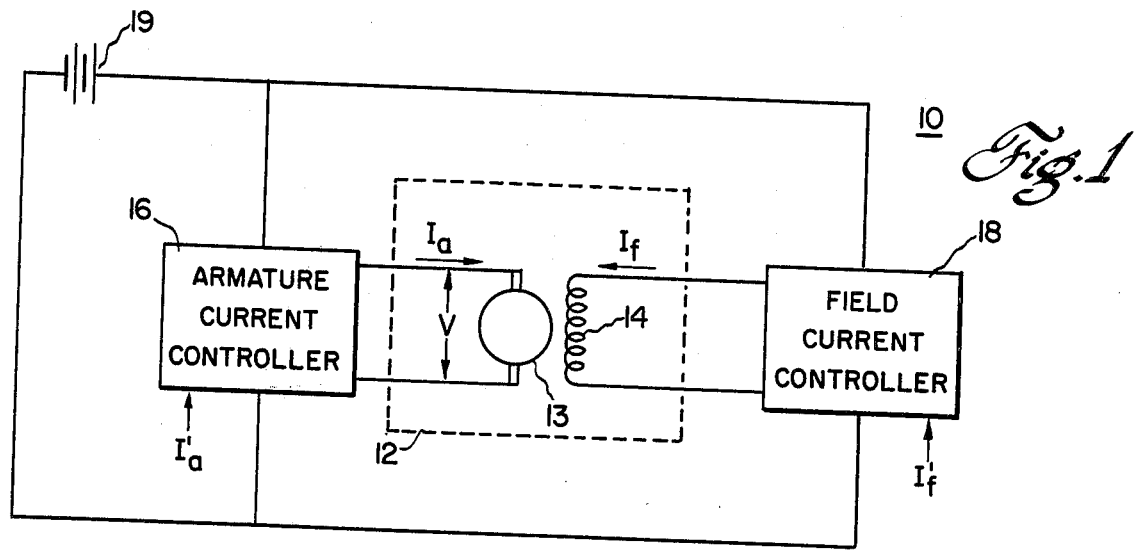
FIG. 1 is a block diagram of a DC motor drive system.

Referring now to FIG. 1, a DC motor drive system 10 comprises a separately excited DC motor 12 including an armature 13 and a field 14. Motor 12 is supplied with armature and field current, respectively, by an armature current controller 16, and a field current controller 18, respectively, in accordance with an armature current control signal $I_a'$ and a field current control signal $I_f'$, respectively, impressed on armature current controller 16 and field current controller 18, respectively. Armature current controller 16 and field current controller 18 are energized from a DC source 15. Various armature current and field current controller circuits exist and selection of such current controller circuits will necessarily depend upon design parameters. Therefore, the details of armature current controller circuit 16 and field current controller circuit 18 are not shown. For a further, more detailed discussion of armature current and field current controller circuits, reference should be had to the text *Power Semiconductor Circuits* by Dewan & Straughen, published by Wiley & Sons (1975).

Heretofore, a common control strategy for operating DC motor drive system 10 has been to maximize motor torque/ampere, that is, with field current fixed, to control motor armature current to achieve maximum motor torque. However, peak motor efficiency is only achieved at a single maximum torque value, resulting in inefficient DC motor operation at torque values other than maximum torque.

Maximum DC motor drive system efficiency irrespective of motor loading and speed is achieved, according to the present invention, by varying motor field current in accordance with armature current so that DC motor 12 is always supplied with optimum field current. The optimum value of field current with respect to armature current can be determined as follows: The terminal voltage $V_a$ across armature 13 of DC motor 12 (neglecting saturation of the magnetic circuit) is defined by equation (1):

$$V_a = E_b + I_a R_a \qquad (1)$$

where $I_a$ = armature current
$E_b$ = motor emf
$R_a$ = armature resistance

The motor emf $E_b$ is proportional to the motor field current $I_f$, as shown by equation (2):

$$E_b = I_f N \tag{2}$$

where N is the angular velocity.

The shaft torque T is related to the field and armature currents $I_f$ and $I_a$, respectively, by the relationship $$T = I_a I_f \tag{3}$$

The motor output power $P_{out}$ is equal to the product of the torque T and the angular velocity N as evidenced by equation (4).

$$P_{out} = TN \tag{4}$$

The motor input power $P_{in}$ is the sum of the motor output power $P_{out}$ and the armature and field losses, as shown by equation (5)

$$P_{in} = TN + I_f^2 R_f + I_a^2 R_a \tag{5}$$

where $R_f$ is the resistance of field 14. From equation (3), the armature current $I_a$ can be expressed as $T/I_f$, allowing equation (5) to be rewritten as:

$$P_{in} = TN + I_f^2 R_f + \frac{T^2 R_a}{I_f^2} \tag{6}$$

The motor efficiency $\eta$ is given by $$\eta = \frac{P_{out}}{P_{in}} = \frac{TN}{TN + I_f^2 R_f + T^2 R_a / I_f^2} \tag{7}$$

Differentiating $\eta$ with respect to $I_f$ yields $$\frac{\partial \eta}{\partial I_f} = \frac{2TN\left(\frac{T^2 R_a}{I_f^3} - I_f R_f\right)}{[T R_a + TN + I_f^2 R_f]^2} \tag{8}$$

Setting $$\frac{\partial \eta}{\partial I_f} = 0$$

yields the conclusion that $\eta$ is a maximum when $$I_f = I_a \sqrt{\frac{R_a}{R_f}} \tag{9}$$

Equations (1) through (9) are written in per unit terms. Thus, varying the field current $I_f$ with respect to armature current $I_a$ in accordance with the relationship given by equation (9) achieves maximum motor efficiency irrespective of motor torque or speed.

Figure 2:
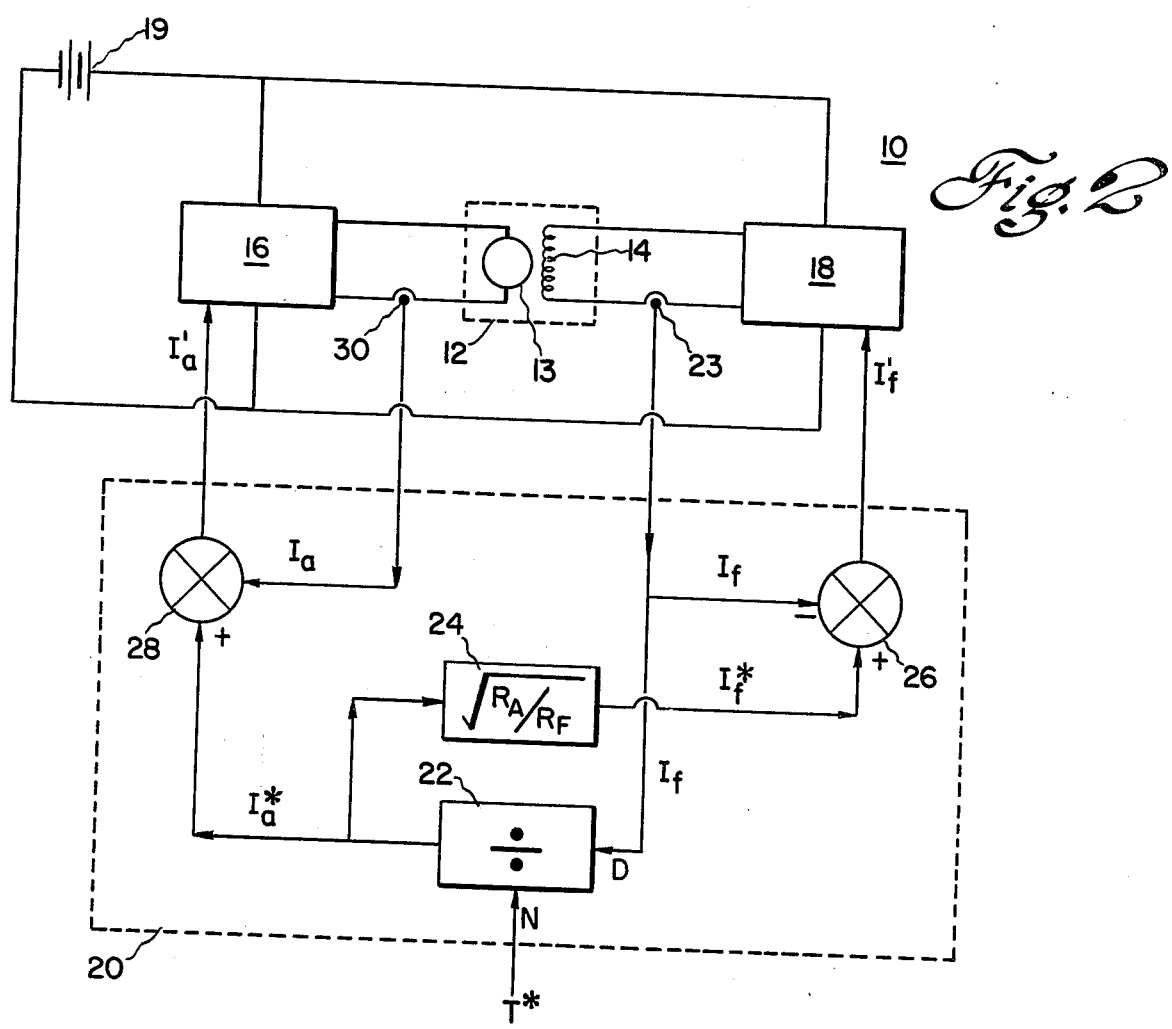
FIG. 2 is a block diagram of the control apparatus of the present invention coupled to the DC motor drive system of FIG. 1.

FIG. 2 shows a control apparatus 20 for optimizing the field current supplied to DC motor 12 in accordance with equation (9), coupled to DC motor drive system 10. Control apparatus 20 includes an analog divider 22 which is supplied at the numerator input N with an operator-commanded motor torque amplitude signal T*, proportional in magnitude to a desired motor torque value. A signal proportional to the magnitude of field current $I_f$ is supplied by field current sensor 23, typically configured of a DC current transformer or the like, to the denominator input D of divider 22 which produces an armature current command signal $I_a$* proportional in magnitude to the ratio of T*/$I_f$.

A scaling amplifier 24 scales the armature current command signal $I_a$* received from divider 22 by the factor $\sqrt{R_a/R_f}$ to yield a field current command signal $I_f$* in accordance with equation (9). In practice, scaling amplifier 24 may be configured from any one of several well known scaling amplifier circuits adjusted to yield a gain proportional to $\sqrt{R_a/R_f}$. The specific details of scaling amplifier 24 are therefore not shown.

The field current command signal $I_f$* generated by scaling amplifier 24 is summed at a summing amplifier 26 with the output signal of current sensor 23 to yield a field current control signal $I_f'$ proportional to the difference in magnitude between $I_f$* and $I_f$. The field current control signal is supplied to field current controller 18 which varies the field current supplied to motor 12 accordingly.

In a similar manner, the armature current command signal $I_a$* generated by divider 22 is summed at a summing amplifier 28 with the output signal of armature current sensor 30, representing the magnitude of armature current $I_a$, to yield an armature current control signal $I_a'$ proportional to the difference in magnitude between $I_a$* and $I_a$. The armature current control signal $I_a'$ is supplied to armature current controller 16 which varies the armature current supplied to motor 12 accordingly.

Although not shown, a microcomputer could easily be utilized to calculate the optimum field current in accordance with equation (9) in place of divider 22 and scaling amplifier 24.

Control of motor drive system 10 is achieved by the operation of control apparatus 20 as follows. When the operator-commanded motor torque amplitude signal T* is applied to the numerator input of divider 22, and a signal proportional to the magnitude of field current $I_f$ is applied to the denominator input, divider 28 provides a resultant armature current command signal $I_a$* proportional to the magnitude of T*/$I_f$. A field current command signal $I_f$* is derived from armature current command signal $I_a$* by scaling it in amplifier 24 in accordance with the relationship between $I_f$ and $I_a$ as given in equation (9). Motor armature current and field current are simultaneously varied by armature current controller 16 and field current controller 18, respectively, in response to the armature current control signal $I_a'$ and field current control signal $I_f'$, respectively, provided by summing amplifiers 28 and 26, respectively, signals $I_a'$ and $I_f'$ being proportional to the difference in magnitude between $I_a$* and $I_a$ and $I_f$* and $I_f$, respectively.

As described, maximum motor efficiency is achieved when the magnitude of field current supplied to motor 12 is optimized with respect to the magnitude of armature current in accordance with the relationship $I_f = I_a \sqrt{R_a/R_f}$. This can be confirmed by reference to Table I which shows per unit motor efficiency as a function of per unit torque output for a per unit speed of 1.0, utilizing the control strategy of the present invention and the conventional fixed field control strategy where $I_f = 1.0$ per unit at all times, under the conditions where $R_a = 0.08$ per unit and $R_f = 0.15$ per unit.

TABLE I

| Required Torque (T) | Optimum Field Current ($I_f$) | Optimum Motor Efficiency | Efficiency at Fixed Field (Prior Art) |
|---|---|---|---|
| 0.1 | 0.2702 | 0.8203 | 0.3987 |
| 0.25 | 0.4273 | 0.8203 | 0.6173 |
| 0.5 | 0.6043 | 0.8203 | 0.7463 |
| 0.75 | 0.7401 | 0.8203 | 0.7937 |
| 1.0 | 0.8546 | 0.8203 | 0.8130 |

The improvement of motor efficiency using the control strategy of the present invention is particularly significant at light motor loads.

The foregoing describes a method and apparatus for operating a separately excited DC motor at maximum efficiency irrespective of motor loading and speed.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

What is claimed is:

1. A method for operating a separately excited DC motor at maximum motor efficiency in response to an operator-commanded motor torque amplitude signal, irrespective of motor torque and speed, comprising the steps of:
   (a) generating an armature current command signal in accordance with a predetermined relationship between said operator-commanded motor torque amplitude signal and field current;
   (b) generating a field current command signal proportional to the magnitude of said armature current command signal;
   (c) varying armature current in accordance with the difference in magnitude between said armature current command signal and armature current; and
   (d) varying field current supplied to said DC motor in accordance with the difference in magnitude between said field current command signal and field current.

2. The method according to claim 1 wherein said armature current command signal is generated proportional to the ratio of the magnitude of said operator-commanded motor torque amplitude signal to the magnitude of motor field current.

3. The method according to claim 1 whereby said field current command signal is generated by scaling said armature current command signal proportional to:

$$\sqrt{R_a/R_f}$$

where
$R_a$ is the armature resistance of said motor, and
$R_f$ is the field resistance of said motor.

4. An improved control apparatus for operating a separately excited DC motor at maximum motor efficiency irrespective of motor torque and speed comprising:
   (a) means for generating an armature current command signal in accordance with a predetermined relationship between an operator-commanded motor torque amplitude signal and motor field current;
   (b) means for generating a field current command signal proportional to the magnitude of said armature current command signal;
   (c) means coupled to the armature of said DC motor and to said means for generating an armature current command signal for providing an armature current control signal to vary motor armature current according to the difference in magnitude between said armature current command signal and armature current; and
   (d) means coupled to the field of said DC motor and to said means for generating a field current command signal for providing a field current control signal to vary motor field current in accordance with the difference in magnitude between said field current command signal and field current.

5. The invention according to claim 4 wherein said means for generating an armature current command signal comprises an analog divider adapted to receive a signal proportional to field current at the denominator input and to receive said operator-commanded motor torque amplitude signal at the numerator input.

6. The invention according to claim 4 wherein said means for generating a field current command signal comprises a scaling amplifier having preselected gain.

7. The invention according to claim 4 wherein said means for providing an armature current control signal to vary armature current comprises:
   (a) armature current sensor means coupled to the armature of said motor for providing an output signal in accordance with the magnitude of armature current; and
   (b) summing amplifier means coupled to said armature current sensor and said means for generating an armature current command signal, said summing amplifier means thereby providing an armature current control signal proportional to the difference between said armature current command signal and said current sensor means output signal.

8. The invention according to claim 4 wherein said means for providing a field current control signal to vary motor field current comprises:
   (a) field current sensor means coupled to the field of said motor for providing an output signal in accordance with the magnitude of field current; and
   (b) summing amplifier means coupled to said means for generating a field current command signal and to said field current sensor means, said summing amplifier means thereby providing a field current control signal proportional to the difference in magnitude between said field current command signal and said field current sensor means output signal.

9. For use with a DC motor drive system comprised of a DC motor excited separately from a DC source by an armature current controller and field current controller, an improved control apparatus, responsive to an operator-commanded motor torque amplitude signal, for operating said DC motor drive system at maximum motor efficiency irrespective of motor torque and speed comprising:
   (a) means for generating an armature current command signal in accordance with a predetermined relationship between said operator-commanded motor torque amplitude signal and motor field current;

(b) means for generating a field current command signal in accordance with the magnitude of said armature current command signal;

(c) first summing amplifier means coupled to said means for generating an armature current command signal and to said motor for providing an armature current control signal to said armature current controller proportional to the magnitude of the deviation of said armature current from said armature current command signal for adjusting armature current accordingly; and (d) second summing amplifier means coupled to said means for generating a field current command signal and to said motor for provciding a field current control signal to said field current controller proportional to the magnitude of the deviation of said field current from said field current command signal for adjusting field current accordingly.

* * * * *